US012785524B2

(12) United States Patent
Ponzio et al.

(10) Patent No.: US 12,785,524 B2
(45) Date of Patent: Nov. 3, 2026

(54) STATOR, APPARATUS AND METHOD FOR PEPARING A PRE-SHAPED INSULATOR

(71) Applicant: ATOP S.p.A., Barberino Tavarnelle (IT)

(72) Inventors: Massimo Ponzio, Siena (IT); Giovanni Manuelli, Florence (IT)

(73) Assignee: ATOP S.p.A., Barberino Tavarnelle (IT)

( * ) Notice: Subject to any disclaimer, the term of this patent is extended or adjusted under 35 U.S.C. 154(b) by 143 days.

(21) Appl. No.: 19/046,112

(22) Filed: Feb. 5, 2025

(65) Prior Publication Data

US 2025/0183745 A1 Jun. 5, 2025

Related U.S. Application Data

(62) Division of application No. 18/015,638, filed as application No. PCT/EP2021/072989 on Aug. 19, 2021, now Pat. No. 12,249,884.

(30) Foreign Application Priority Data

Aug. 20, 2020 (EP) .................................... 20191844

(51) Int. Cl.

| | |
|---|---|
| ***H02K 15/10*** | (2025.01) |
| ***H02K 3/34*** | (2006.01) |
| ***H02K 15/04*** | (2006.01) |

(52) U.S. Cl.

CPC ............. *H02K 15/10* (2013.01); *H02K 3/345* (2013.01); *H02K 15/04* (2013.01); *H02K 15/105* (2013.01)

(58) Field of Classification Search

CPC ...... H02K 15/10; H02K 15/04; H02K 15/105; H02K 3/345; H02K 3/34; H02K 15/20; H02K 3/14

See application file for complete search history.

(56) References Cited

U.S. PATENT DOCUMENTS

| | | | |
|---|---|---|---|
| 5,650,683 | A | 7/1997 | Shiga et al. |
| 8,446,061 | B2 | 5/2013 | Nakayama et al. |
| 8,456,053 | B2 | 6/2013 | Kaiser et al. |

(Continued)

FOREIGN PATENT DOCUMENTS

| | | |
|---|---|---|
| CN | 103460561 | 12/2013 |
| CN | 109478816 | 3/2019 |

(Continued)

*Primary Examiner* — Mohamad A Musleh

(74) *Attorney, Agent, or Firm* — HG Law LLP; Jeffrey H. Ingerman

(57) ABSTRACT

The invention relates to a stator (1) which may be used within an electric rotating machine, an apparatus for preparing pre-shaped insulators and a method for preparing a pre-shaped insulator. The stator (1) comprises a stator core (10) which has a plurality of axially extending slots (11) arranged in a circumferential direction (C) of the stator core (10) and at least two conductors (20, 21) arranged along a radial direction (R) of the same slot (11). Each conductor (20, 21) is peripherally wrapped by an individual insulator (30) which extends around the outer circumference (22) of the conductor (20, 21), such that in circumferential direction the insulator (30) comprises a one-layer-section (37) and an overlapping section (31) which extend along the complete axial length (29) of the insulator (30).

7 Claims, 6 Drawing Sheets

(56) References Cited

U.S. PATENT DOCUMENTS

Figure 1:
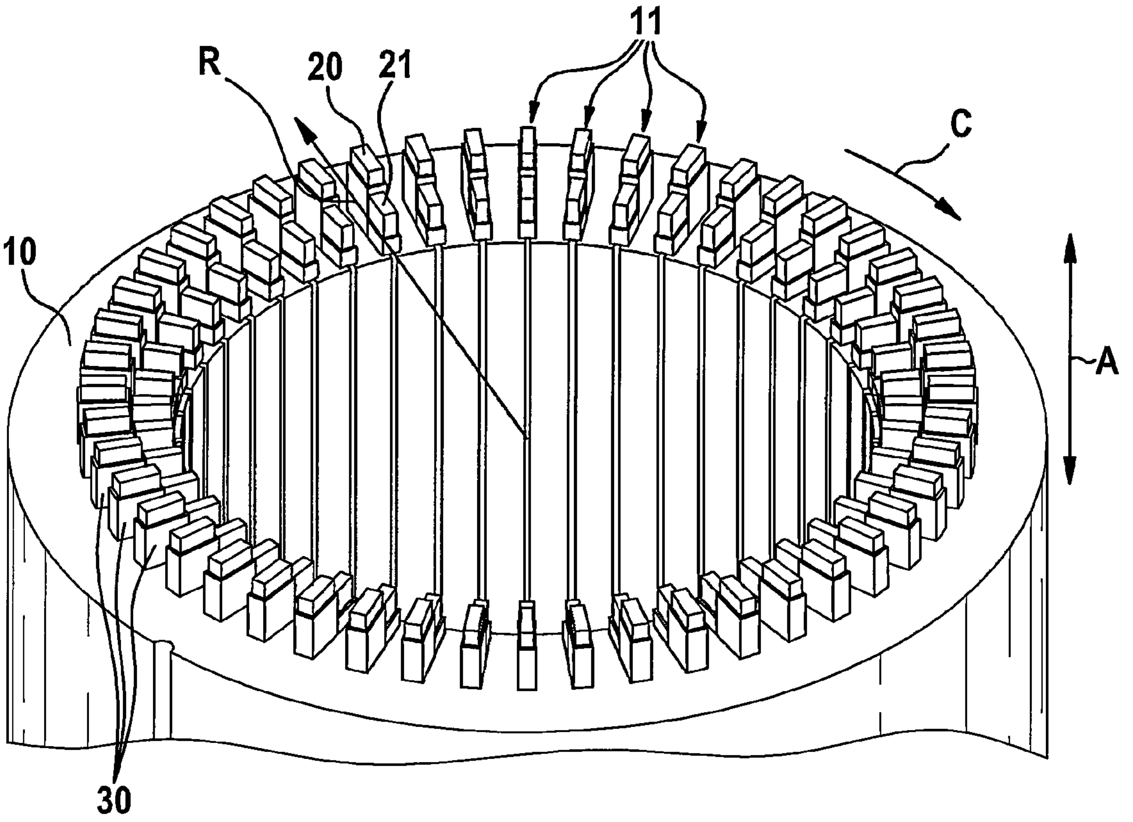

| | | | |
|---|---|---|---|
| 8,610,326 | B2 | 12/2013 | Fukushima et al. |
| 9,130,430 | B2 | 9/2015 | Chamberlin et al. |
| 2013/0033132 | A1 | 2/2013 | Jayasoma et al. |
| 2015/0188379 | A1 | 7/2015 | Jung et al. |
| 2016/0181882 | A1 | 6/2016 | Iwaki |
| 2020/0227968 | A1 | 7/2020 | Yoshitake et al. |

FOREIGN PATENT DOCUMENTS

| | | | | | |
|---|---|---|---|---|---|
| CN | 109950988 | | | 6/2019 | |
| CN | 111512520 | | | 8/2020 | |
| DE | 102012206039 | | | 10/2013 | |
| DE | 102019003258 | | | 7/2019 | |
| IT | RM20100123 | | | 9/2011 | |
| JP | 2008/011693 | | | 1/2008 | |
| JP | 2011160587 | A | * | 8/2011 | |
| JP | 2013/192363 | | | 9/2013 | |
| WO | 2009/0102015 | | | 8/2009 | |
| WO | WO-2009102015 | A1 | * | 8/2009 | ........... H02K 15/105 |
| WO | 2011/142264 | | | 11/2011 | |
| WO | 2012/176705 | | | 12/2012 | |
| WO | 2015/019685 | | | 2/2015 | |
| WO | 2019/073651 | | | 4/2019 | |

* cited by examiner

STATOR, APPARATUS AND METHOD FOR PEPARING A PRE-SHAPED INSULATOR

This is a division of copending, commonly-assigned U.S. patent application Ser. No. 18/015,638 (now U.S. Pat. No. 12,249,884), filed Jan. 11, 2023 as the national stage of International Application No. PCT/EP2021/072989, filed Aug. 19, 2021, each of which is hereby incorporated by reference herein in its respective entirety.

The invention relates to a stator which may be used within an electric rotating machine, an apparatus for preparing pre-shaped insulators and a method for preparing a pre-shaped insulator.

Usually a plurality of slots is formed in a stator core. The slots extend in an axial direction of the stator. The stator comprises a stator winding made of conductors having an in-slot portion disposed in the slots.

In stator assemblies insulating sheets are used for lining the walls of the slots of the stator core. In case of stator assemblies where more than one conductor is inserted into one slot, insulation sheets can also be used for providing insulation between neighbouring conductors. Although conductors usually are connected together at their ends, care must be taken to ensure that adjacent conductors do not touch each other and short circuit the designed winding arrangement. For this purpose it is e.g. known to provide a sheet of insulating material bent into a S-shape, as it is e.g. shown in EP 3 427 920 A1.

The S-shaped design usually does not provide a complete closure such that gaps exist between the slot liner and the inner surface of the stator slot or even between two adjacent conductors. Such gaps also may be present when the sheet of insulating material is bent into a B-shape, as for example shown in U.S. Pat. No. 8,456,056 B2.

U.S. Pat. No. 8,446,061 B1 and US 2015/0188379 disclose insulation units for stator cores. An insulator encircles two or more neighbouring conductors and provides overlapping sections.

Before the insulator sheets can be inserted into the slots they have to be pre-shaped, typically from an initially flat continuous sheet. A pre-shaped insulator providing one or more overlapping sections needs a plurality of folding steps, such that manufacturing is complex, time consuming and costly.

It is therefore an object of the present invention to overcome the drawbacks of the prior art and in particular to provide a stator, an apparatus and a method which provide an arrangement with sufficient insulation and which allow an increase of accuracy of the shaping operation. The apparatus and method preferably should allow a fine tuning or adjustment of the shape.

According to the invention these and other objects are solved with a stator, an apparatus and a method according to the independent claims.

According to the invention a stator for a rotating electric machine comprises a stator core which has a plurality of axially extending slots arranged in a circumferential direction of the stator core.

Within this application the terms axial, circumferential and radial refer to the geometry of the stator.

At least two conductors are arranged next to each other along a radial direction of at least one slot and preferably of each slot.

Each of the at least two conductors is peripherally wrapped by an individual insulator which extends around the outer circumference of the conductor, such that in circumferential direction the insulator comprises a one-layer-section and an overlapping section.

There may be further conductors in the same slot not being individually wrapped by an insulator and/or being insulated towards the stator core and/or towards another conductor otherwise.

The one-layer-section and the overlapping section of each insulator extend along the complete axial length of the insulator.

The axial length of each insulator is equal to or larger than the axial extension of the slot. Typically, the axial length of each insulator depends on the axial length of the corresponding conductor, such that in particular the conductors do not comprise non-insulated in-slot portions and such that non-insulated axial ends of the conductors protrude from the insulator outside the stator core.

The circumferential length of the insulator is larger than the circumferential length of the conductor, such that the overlapping section is formed.

The overlapping section provides a complete closure and a gap is avoided.

Thus, each conductor is insulated around its circumference with respect to the walls of the slot and with respect to the neighbouring conductor.

In an embodiment of the stator, the insulators overlap at a lateral side of the conductor, which faces the circumferential direction.

As each conductor comprises an individual insulator, there are at least two insulation layers between two adjacent conductors.

Insulators overlapping at a lateral side of the conductor additionally provide a two layer section between the conductor and a circumferential wall of the slot. Gaps are avoided.

Preferably all insulators of conductors arranged in one slot overlap at the same lateral side. Hence, the conductors are arranged in one row, and the slot may be formed to provide enough space for the conductors and the overlapping section of the insulators.

The arrangement may be slightly asymmetric in a plane perpendicular to the axis of the stator core, since the distance between the conductors and a first lateral wall (i.e. a wall running substantially radially and facing a circumferential direction) of the slot may be smaller than the distance between the conductors and the second lateral wall of the slot.

Advantageously each slot is open towards the axis of the stator core.

Each slot may comprise a narrowing at the radially inner end of the slot with a radially extending centreline. The opening towards the axis may comprise a circumferential width which is smaller than the maximal circumferential width of the slot. The opening may be arranged circumferentially symmetrically or asymmetrically with respect to the maximal circumferential width of the slot.

A circumferential distance between a first lateral wall of the slot and the radially extending centreline of the opening may be smaller than a circumferential distance between a second lateral wall of the slot and the centreline. The difference between the circumferential distances preferably is equal to or larger than the thickness of the insulator. Hence, the overlapping section may be arranged between the conductors and the second lateral wall.

Conductors having the same cross sectional areas may be wrapped by conductors of the same type of pre-shaped insulators. As only one or a few types of such insulators have to be provided, easy manufacturing is possible.

A conductor may be formed by several conducting parts, such as strands or wires. Apart from the pre-shaped insulators arranged in the slot, one conductor basically fills the slot in the circumferential direction.

The conductors may have a rectangular cross section with a radial length of 1.5 mm to 11 mm, preferably 4 mm to 10 mm and a circumferential width of 1.5 mm to 6 mm, preferably of 3.9 mm to 4.1 mm.

The external diameter of the stator core may be 200 mm to 250 mm, preferably 220 mm to 225 mm. The internal diameter of the stator core may be 150 mm to 160 mm, preferably 155 mm to 156 mm. The axial lengths of the stator core may be 50 mm to 200 mm, preferably 125 mm to 130 mm. The stator core may comprise 40 to 100 slots, preferably 45 to 50 slots.

According to another aspect of the invention an apparatus for preparing pre-shaped insulators from an insulator sheet is provided, preferably for use in a stator as described above.

The apparatus comprises a bending station.

The bending station has a base station comprising a recess with a contact surface defining a first part of an outer circumference of the pre-shaped insulator.

Preferably, the base station comprises a central bottom part and two opposing wall parts. The wall parts may be arranged perpendicularly to the bottom part. Preferably, the width of the central bottom part corresponds to the radial width of the pre-shaped insulator to be formed and the height of the wall parts correspond to the circumferential width of the pre-shaped insulator to be formed.

The insulator may have a rectangular cross section and the width of the central bottom part and the height of the opposing walls may correspond to the dimensions of the pre-shaped insulator to be formed seen in a cross section in a plane perpendicular to the axial direction.

Typically, the width of the central bottom part of the contact surface is smaller than the radial width of the slots of the stator core since at least two conductors and therefore at least two pre-shaped insulators shall be inserted into one slot. The width of the central bottom part of the contact surface corresponds to the radial width of the conductors.

The central bottom part and the wall parts are preferably each formed by at least one rectangular flat surface.

The axial length of the base station may correspond to the axial length of the pre-shaped insulator to be formed and may depend on the length of a conductor to be placed in the slot of a stator core. The axial length of the central bottom part and the wall parts may be larger than the axial length of the slots and shorter than the axial length of the conductor.

Alternatively, the length of the central bottom part and the wall parts may be shorter than the pre-shaped insulator to be formed.

The axial length of the wall parts may be shorter than the axial length of the central bottom part. Several wall parts may be arranged along the length of the central bottom part.

The base station may comprise several central bottom parts and/or several wall parts arranged along an axial length of a pre-shaped insulator to be formed.

The bending station further comprises a stamp member laterally moveable with respect to the recess from an open to a closed position. When the stamp member is arranged within the recess, the stamp member is in the closed position. When the stamp member is outside the recess the stamp member is in the open position.

The stamp member comprises an inner contact surface for pressing a central part of the insulator sheet against the contact surface of the recess. When the stamp member is moved to the closed position, the inner contact surface of the stamp member and the outer contact surface of the base member form a central part of the circumference of the pre-shaped insulator.

Preferably, the stamp member may comprise an inner bottom part and two opposing side parts, wherein the side parts may be arranged perpendicularly to the inner bottom part.

The contact surface of the base member and the inner contact surface of the stamp member may have corresponding shapes and dimensions.

The inner bottom part and/or the side parts may each comprise at least one rectangular flat surface and may respectively correspond to the shapes and dimensions of the bottom part and/or the wall parts of the base member.

The stamp member also comprises an outer contact surface for forming a second part of the circumference of the pre-shaped insulator.

The outer contact surface preferably is arranged opposite to the inner bottom part.

Preferably, the outer contact surface has the same width as the central bottom part of the stamp member.

The width of the outer contact surface corresponds to the radial width of the pre-shaped insulator to be formed and to the radial width of the conductor to be placed in the slot of a stator core.

The outer contact surface may include at least one rectangular flat surface.

The bending station further comprises a first bending operator moveable with respect to the base station from an open to a closed position, comprising a first bending surface for bending a first tail of the insulator sheet against the outer contact surface of the stamp member, when the stamp member is in the closed position.

The first bending operator preferably is in a closed position, when the first bending surface is opposite and close to the outer contact surface of the stamp member.

The first bending surface may include at least one rectangular flat surface, which may be pressed against a first tail of the insulator sheet.

The bending station further comprises a second bending operator moveable with respect to the base station from an open to a closed position, comprising a second bending surface for bending a second tail of the insulator sheet against the first tail and/or the outer contact surface of the stamp member.

The second bending operator preferably is in a closed position, when the second bending surface is opposite and close to the outer contact surface of the stamp member.

The second bending surface may include at least one rectangular flat surface, which may be pressed against the second tail of the insulator sheet.

The first and/or the second bending surface may include several rectangular flat surfaces, which may be separated by a groove extending in an axial direction.

Preferably, the contact surface of the base station, the inner contact surface of the stamp member, the outer contact surface of the stamp member, the first bending surface and the second bending surface are shaped and arrangeable to form a pre-shaped insulator, such that the pre-shaped insulator has a rectangular cross section in a plane perpendicular to the axial direction.

Shaping of a pre-shaped insulator from an insulator sheet may be provided in only few steps by moving the stamp member, the first bending operator and the second operator.

The base station, the stamp member, the first bending operator and the second operator may be separate parts and may be individually moveable with respect to each other.

The parts may also be connected to each other.

The bending station may comprise one base station, one stamp member, one first and one second bending operator for forming one pre-shaped insulator. Alternatively, the bending station may comprise more than one base station, more than one stamp member, more than one first and/or more than one second bending operator for forming one pre-shaped insulator, which may each be arranged along the axial length of the pre-shaped insulator to be formed.

The bending station may comprise actuation members for moving the stamp member, the first bending operator and the second operator, such as hydraulic, pneumatic and/or electric drivers.

According to a preferred embodiment of the invention, the first bending operator and/or the second bending operator are rotatably mounted at the base station.

For moving the first bending operator and/or the second bending operator from an open position to a close position, the first bending operator and/or the second bending operator are rotated around the base station.

The stamp member may be mounted to the base station by a connecting arm, which may be laterally moved or along which the stamp member may be translated towards and away from the base station.

The sum of the width of the first bending surface and of the width of the second bending surface may correspond to the width of the stamp member, in particular to the widths of the outer contact surface, such that the first bending surface and the second bending surface fully cover the width of the outer contact surface in the closed position.

The second bending surface preferably has a larger width than the first bending surface.

After the first bending operator has been brought to the closed position and a first tail has been brought into contact with the outer contact surface, there is still space to place a second tail of the insulator sheet onto the stamp member and onto the first tail to allow an overlapping section.

Advantageously, the outer contact surface of the stamp member comprises a depression for receiving the first tail of the insulator sheet. When the first tail is pressed onto the stamp member by the first bending member, the outer surface of the first tail and the remaining free surface of the stamp member are aligned in the same plane, onto which the second tail can be pressed by the second bending member. The tails of the insulator sheet can be pressed tightly together and the pre-shaped insulator has a closed shape without any gap.

In a further preferred embodiment of the invention, the stamp member comprises at least one groove running in a direction parallel to a bending line of the insulator, on a side facing the base station. The base station comprises at least one groove running in a direction parallel to a bending line of the insulator. Said grooves are open in a direction opposite to each other when the stamp member is in the closed position.

Additionally or alternatively the stamp member may comprise at least one groove running in a direction parallel to a bending line of the insulator arranged on the side facing away from the base station. The second bending surface may comprise at least one groove running in a direction parallel to a bending line of the insulator. Said grooves are open in a direction opposite to each other when the second bending operator is in the closed position.

Said slots allow introducing a removing tool for removing the shaped insulator from the bending station when the stamp member and the bending operators are in the closed position.

The pre-shaped insulator may be transferred directly into a slot of a stator core or into a transfer station.

The removing tool may be inserted into the grooves on one axial side of the bending station to push the pre-shaped insulator out of the other axial side of the bending station.

In a beneficial embodiment the apparatus further comprises a feed station for feeding insulating material from a continuous strip.

The feed station comprises a cutter for cutting flat sheets of insulating material of a continuously supplied sheet of insulating material.

It further may comprise an embossing unit for applying longitudinal embossings into the insulating material forming predefined bending lines.

The feed station furthermore may comprise a supply unit. The supply unit may either supply the cut sheets to the bending station or may supply the continuous strip to the bending station, where the sheets will be cut prior to the bending or after bending.

If the sheets are cut after at least partial bending, the second tail remains connected to the continuous strip.

Additionally or alternatively the apparatus may comprise an insertion station for inserting at least two pre-shaped insulators into a slot of a stator core. The insertion station may comprise removing tools for removing the fully closed insulator from the bending station and optionally for transferring the pre-shaped insulator into the slots of the stator.

Insertion preferably can also be achieved by transferring sheets in the fully closed shape to a transfer station for temporarily receiving at least two sheets and by transferring the at least two sheets from the transfer station into the slot of the stator.

According to another aspect of the invention a method for preparing pre-shaped insulators from an insulator sheet is provided, preferably for a stator as described above, preferably with an apparatus as described above.

A cut insulator sheet of a flat insulating material is provided in a bending station of the apparatus between a base station comprising a recess and a stamp member.

A part of the insulator sheet is then pressed into the recess by moving the stamp member laterally into the recess. Thereby a U-shaped insulator sheet with a first tail and a second tail is formed.

A first bending operator is moved with respect to the base station such that the first tail gets in contact with an outer contact surface of the stamp member. A second bending operator is moved with respect to the base station such that the second tail gets in contact with the outer contact surface of the stamp member and/or to the first tail. The first and the second bending member may press the first and the second tail on the stamp member over the entire outer contact surface.

The flat insulating material is bent to form a pre-shaped insulating member having a closed shape. Preferably, the second tail is pressed against the first tail to form an overlapping section, such that the shaped form is securely closed.

Advantageously, the first bending operator and the second bending operator are rotated around a respective rotation axis relatively to the base station.

The method may comprise the further step of introducing a removing tool of an insertion station into opposing slots of the stamp member and the base station and/or into opposing slots of the stamp member and of the second bending operator. The removing tool may contact the pre-shaped insulator and may be moved within the apparatus to thereby remove the pre-shaped insulator from the bending station of the apparatus.

At least two pre-shaped insulators may be arranged in a transfer station preferably close to each other. For example, the pre-shaped insulators may be pushed out of the bending station into the transfer station. The at least two pre-shaped insulators may be inserted into a slot of a stator core in one step.

Figure 2:
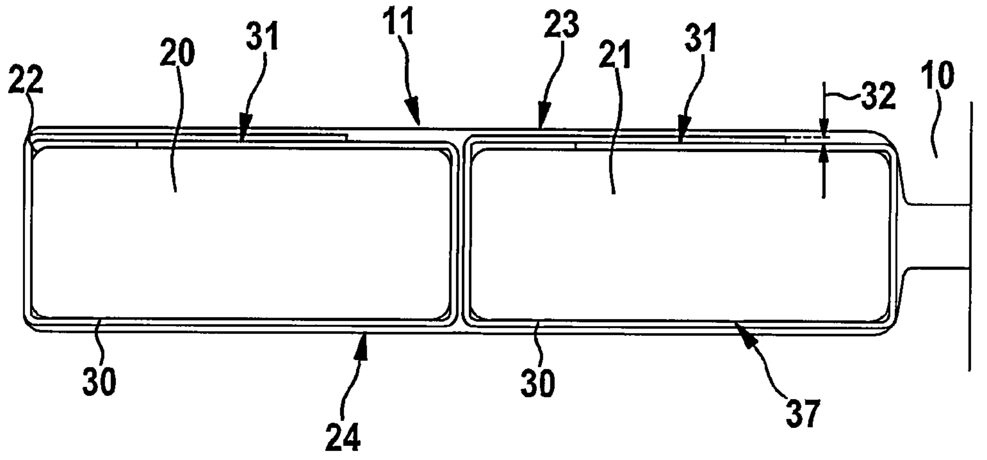
Figure 3:
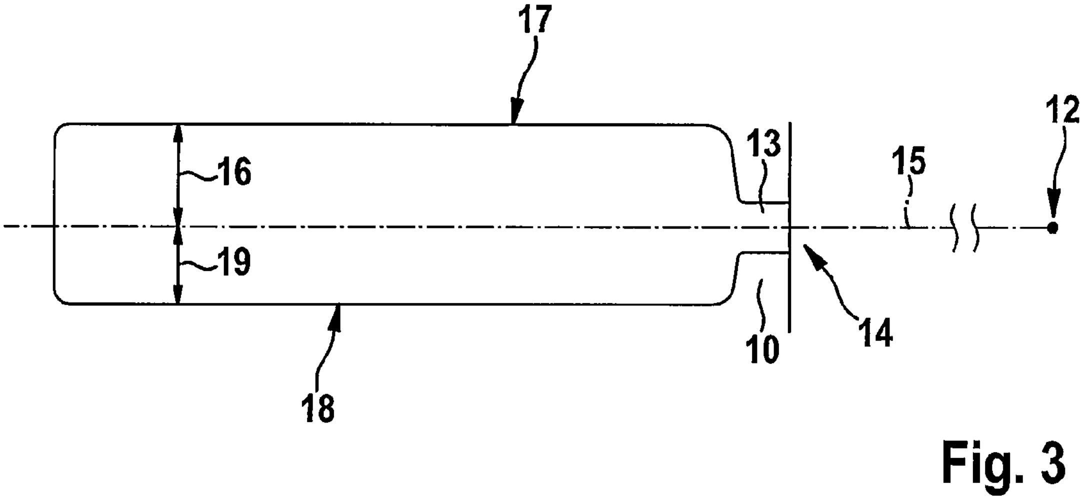
Figure 5:
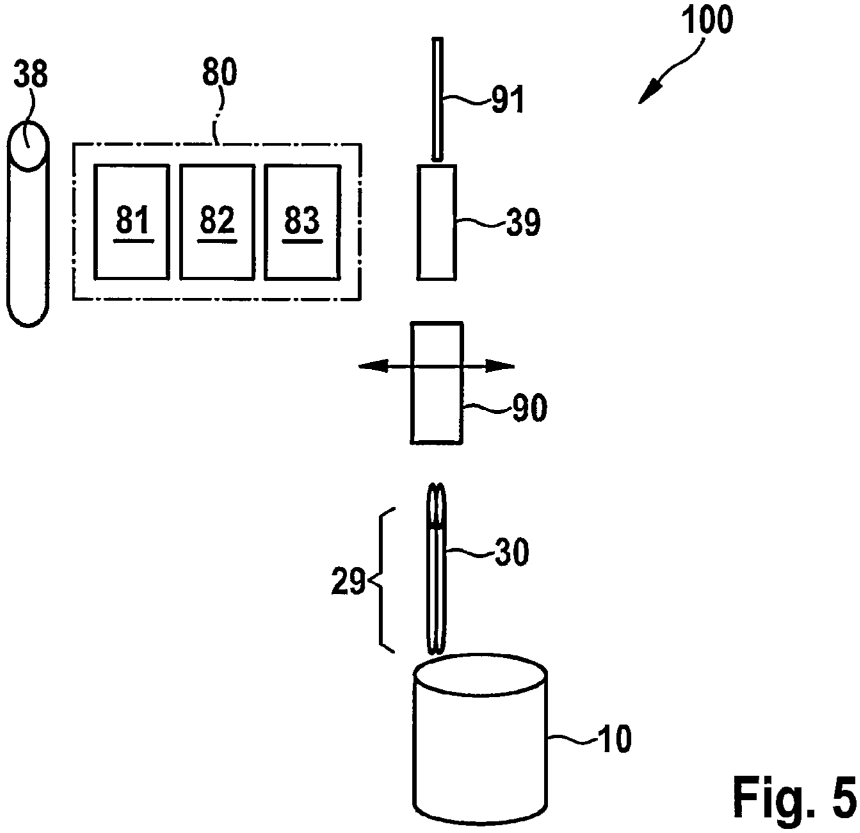
Figure 6A:
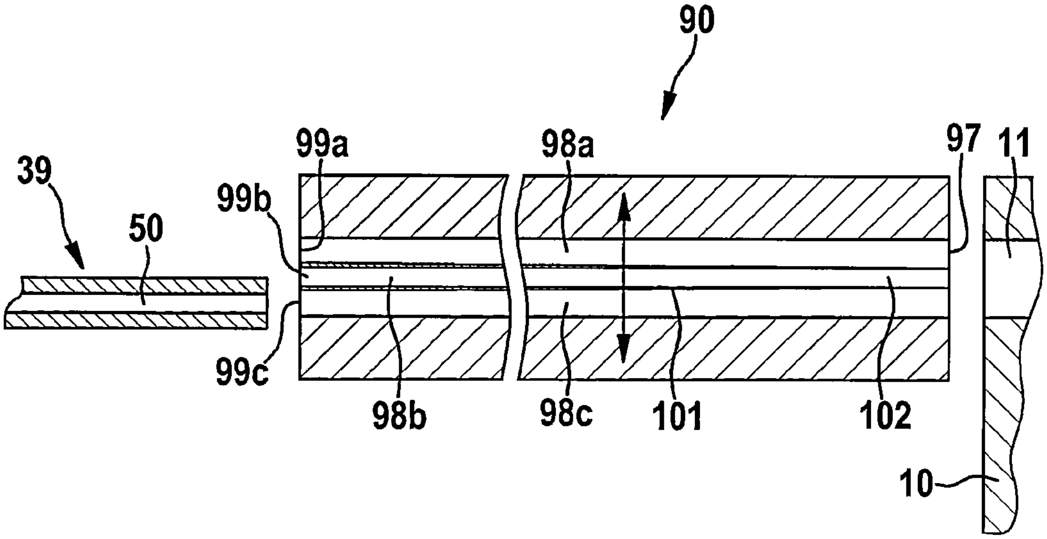
Figure 6B:
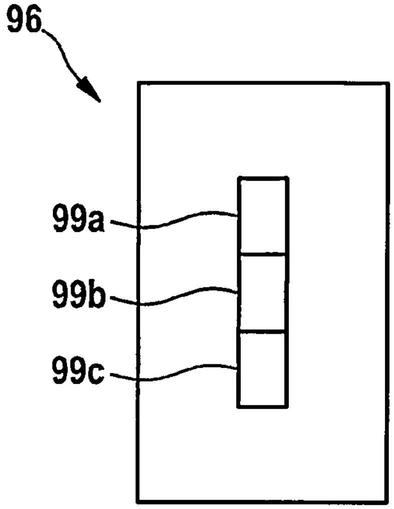

For forming the pre-shaped insulators insulator sheets may be used which are offered under the name NOMEX of MYLAR. The thickness of the sheet may be 0.1 mm to 0.5 mm, preferably 0.18 mm to 0.3 mm The invention will now be described with reference to a preferred embodiment and the drawings, which show:

FIG. 1 a stator core in a perspective view,

FIG. 2 a schematic view of a slot of stator core with insulating sheets in top view;

FIG. 3 a schematic view of a slot of stator core in top view;

FIG. 4*a-e* schematic views of a bending station in top view in different positions;

FIG. 5 a schematic presentation of an apparatus;

FIG. 6*a* a schematic cross section along the longitudinal axis of a receiving section;

FIG. 6*b* a front view of the exit opening of the receiving section according to FIG. 6*a*.

FIG. 1 shows a stator core 10 in a perspective view. The stator core 10 has a plurality of slots 11 extending in an axial direction A and arranged in a circumferential direction C of the stator core 10. Two conductors 20, 21 are arranged along a radial direction R of each slot 11. Each conductor 20, 21 is peripherally wrapped by an individual insulator 30.

FIG. 2 shows a schematic view of the slot 11 of the stator core 10 with insulating sheets 30 in top view.

The individual insulators 30 extend around the outer circumference 22 of the conductors 20, 21, such that the insulator 30 comprises a one-layer-section 37 and an overlapping section 31 which extends along the complete axial length 29 (see FIG. 4) of the insulator 30.

Both insulators 30 arranged in one slot 11 overlap at the same lateral side 23 of the conductors 20, 21.

FIG. 3 shows a schematic view of a slot 11 in a top view.

The slot 11 is open towards the axial centre 12 of the stator core 10 and comprises a narrowing 13 at the radially inner end 14 of the slot 11 with a radially extending centreline 15.

A circumferential distance 16 between a first lateral wall 17 of the slot 11 and the centreline 15 is larger than a circumferential distance 18 between a second lateral wall 19 of the slot 11 and the centreline 15. The difference corresponds to the thickness 32 of the insulator 30 (see FIG. 2).

FIGS. 4*a-e* show schematic views of a bending station 39 for forming a pre-shaped insulator from an insulator sheet 33 in a top view, that is in a plane perpendicular to the axial direction A (see FIG. 1), during different steps of a bending process.

The bending station 39 comprises a base station 40 with a recess 41.

The recess 41 comprises a contact surface 42 for forming a first part of an outer circumference of the pre-shaped insulator 30.

The contact surface 42 is made up of a central bottom part 47 and two opposing wall parts 46 of the base station 39.

Figure 4A:
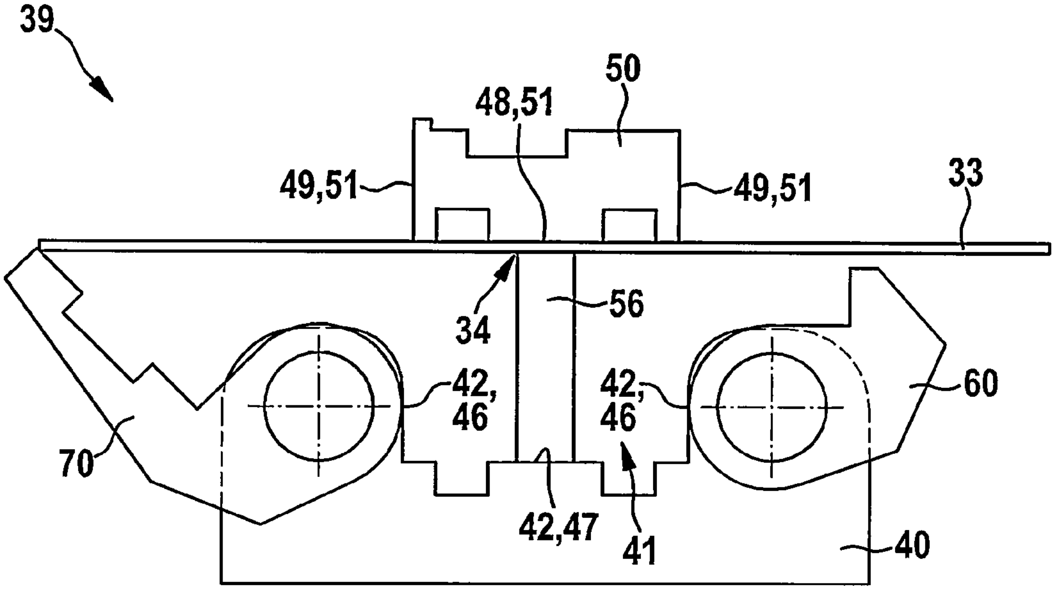

The bending station 39 comprises a stamp member 50. The stamp member 50 and the base station 40 can be translated relatively to each other, such that the stamp member is laterally moveable with respect to the recess 41 from an open position as shown in FIG. 4*a* to a closed position as shown in FIGS. 4*c* to 4*e*.

An insulator sheet 33 may be inserted between the base station 40 and the stamp member 50 and may be held in position by a spring-loaded clamping element 56. The clamping element 56 can be pushed into a recess of the base station 40, for example when the base station 40 and the stamp member 50 approach each other so that the stamp member 50 gets into the closed position.

Figure 4B:
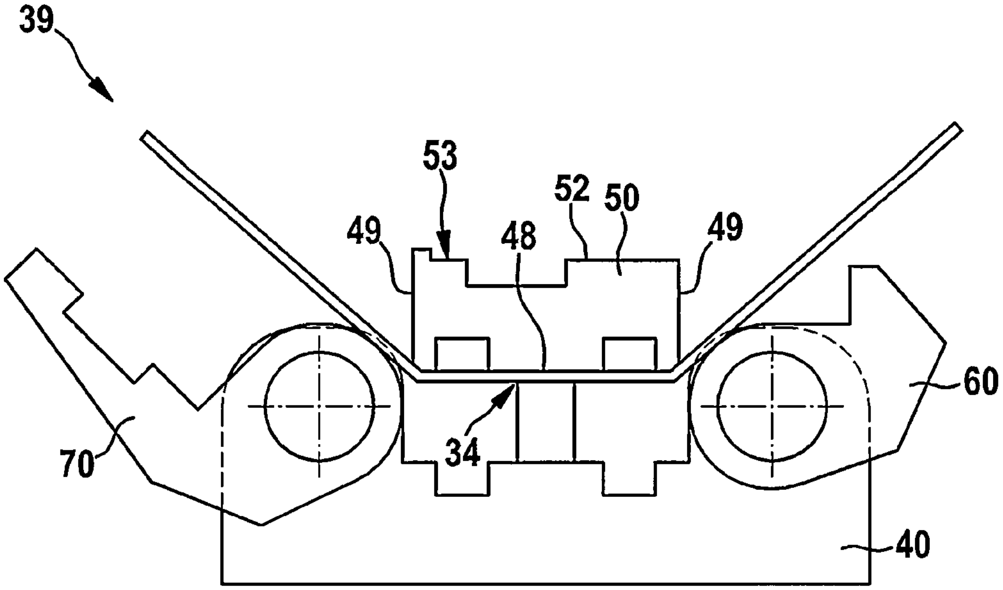
Figure 4C:
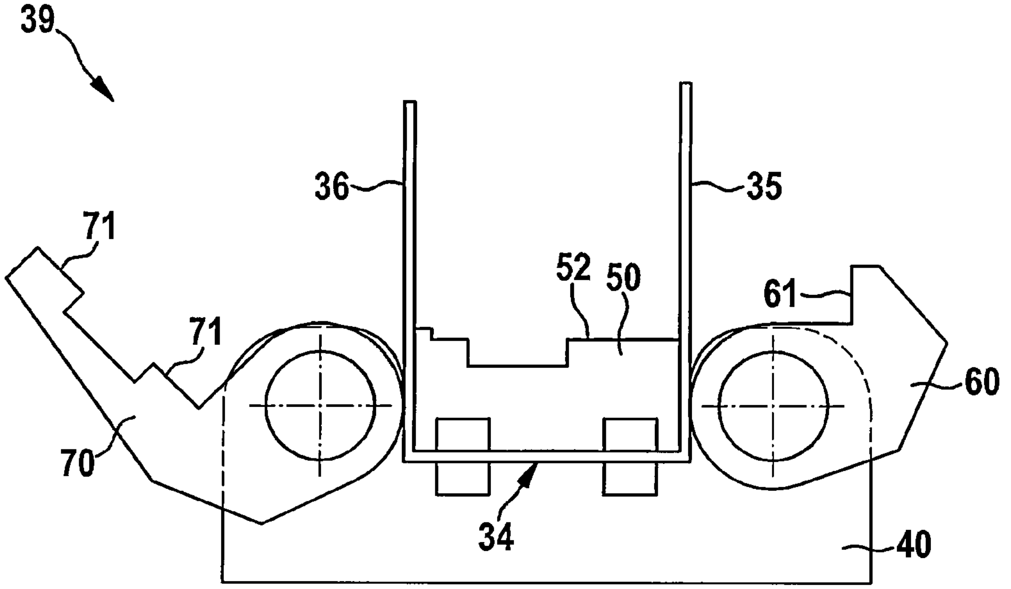
Figure 4D:
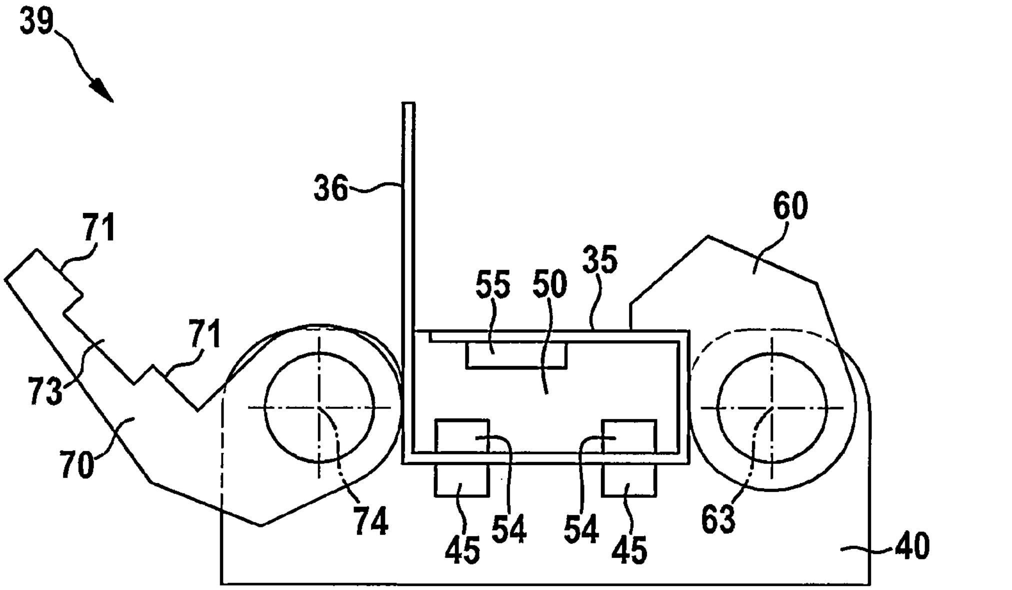
Figure 4E:
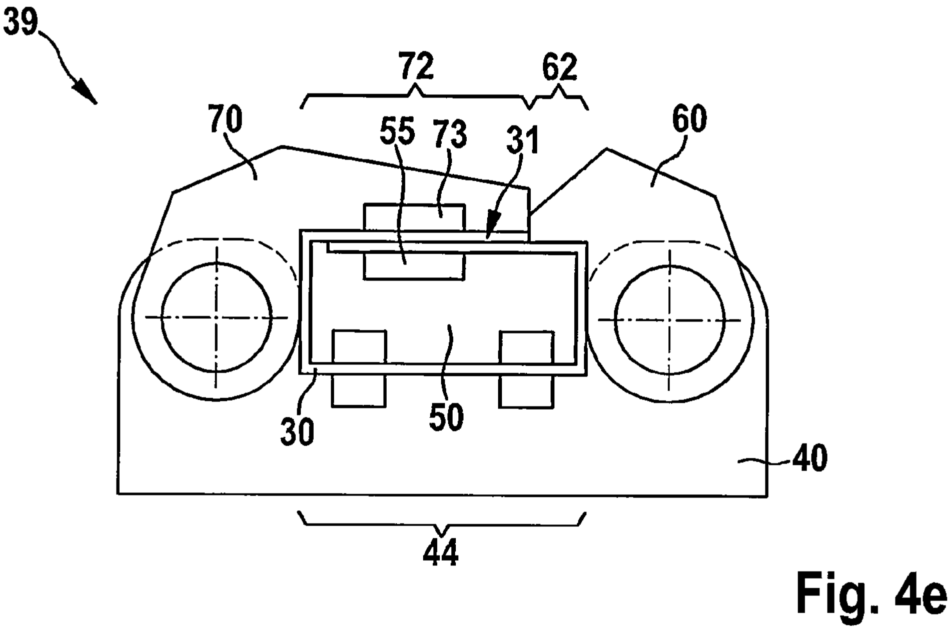

The stamp member 50 has an inner contact surface 51, which presses a middle part 34 of the insulator sheet 33 against the contact surface 42 of the recess 41 when moved into the closed position as shown in FIGS. 4*b* and 4*c*.

The inner contact surface is made up of a central inner bottom part 48 and two opposing inner side parts 49.

The contact surface 42 of the base member 40 and the inner contact surface 51 of the stamp member 50 form a first part of the pre-shaped insulator 30 to be formed from a middle part 34 of the insulator sheet 33.

The stamp member 50 further comprises an outer contact surface 52 which is opposite to the inner bottom part 48.

The bending station 39 comprises a first bending operator 60 moveable with respect to the base station 40 from an open position as shown in FIGS. 4*a*-4*c*, to a closed position as seen in FIGS. 4*d* and 4*e*.

The first bending operator 60 comprises a first bending surface 61 for bending a first tail 35 of the insulator sheet 33 against the outer contact surface 52 of the stamp member 50, as shown in FIG. 4*d*.

The bending station 39 comprises a second bending operator 70 moveable with respect to the base station 40 from an open position as shown in FIGS. 4*a*-4*d*, to a closed position, as shown in FIG. 4*e*, comprising a second bending surface 71. The second bending operator 70 presses a second tail 36 of the insulator sheet 33 against the first tail 35 and the outer contact surface 52 of the stamp member 50 as shown in FIG. 4*e*. Thereby an overlapping section 31 is formed.

The first bending operator 60 and the second bending operator 70 may be rotated around a respective rotation axis 63, 74.

The rotational movement may be driven by a lever system being connected to air cylinders (not shown in the figures).

The sum of the width 62 of the first bending surface 61 (see FIGS. 4*c* and 4*e*) and of the width 72 of the second bending surface 71 (see FIGS. 4*c* and 4*e*) corresponds to a width 44 of the stamp member 50, such that the first bending surface 61 and the second bending surface 71 together with the outer contact surface 52 of the stamp member 50 form the second part of the outer circumference of the pre-shaped insulator 30.

As shown in FIGS. 4*d* and 4*e* the stamp member 50 comprises two grooves 54 running in a direction parallel to a bending line of the insulator 33 and the base station 40 comprises two grooves 45 running in a direction parallel to a bending line of the insulator. Said grooves 45, 54 are open in a direction opposite to each other when the stamp member 50 is in the closed position (see FIG. 4*d*).

A further groove 73 is arranged in the second bending surface 71 running in a direction parallel to a bending line of the insulator. Also the stamp member 50 comprises a further groove 55 on the side facing away from the base station 40 running in a direction parallel to a bending line of the insulator 30. Said grooves 55, 73 are open in a direction opposite to each other when the second bending operator 70 is in the closed position (see FIG. 4*e*).

The pairs of grooves 55, 74 and 45, 54 facing each other when the bending station 39 is in the closed position allow introducing a removing tool 91 (see FIG. 5) for pushing the shaped insulator 30 out of the bending station 39. The removing tool comprises a blade (not explicitly shown in the figures) for each of the pairs of grooves 55 and 74, 55 and 74 and 45 and 54.

The axial lengths of the bending station 39 may correspond to the axial lengths of the pre-shaped insulator 30 to be formed.

Alternatively, a plurality of bending stations 39 may be arranged along the axial length for forming one pre-shaped insulator 30.

The axial length of the stamp member 50, the first bending operator 60 and the second bending operator 70 may correspond to the axial length of the base station 40. Alternatively, a plurality of stamp members 50, first bending operators 60 and/or second bending operators 70 may be arranged along the axial length of the base station 40.

FIG. 5 shows a schematic presentation of an apparatus 100. The apparatus 100 comprises a bending station 39 as described in FIGS. 4*a*-4*e*.

The apparatus 100 further comprises a feed station 80.

The feed station 80 comprises an embossing unit 81 for applying longitudinal embossings into a continuously supplied sheet of insulating material 38.

The feed station 80 comprises a supply unit 82 for supplying the embossed insulating material 38 to the bending station 39.

The feed station 80 comprises a cutter 83 for cutting flat sheets 33 (see FIG. 4*a*) of insulating material from the continuously supplied sheet of insulating material 38.

The feed station 80 comprises a supply unit 83 for supplying the cut sheets 33 to the bending station 39.

The apparatus 100 comprises a removing tool 91 for pushing pre-shaped insulators 30 out of the bending station 39 into a transfer station 90.

The transfer station 90 collects at least two pre-shaped insulators 30 which are introduced into one slot 11 (see FIG. 6*a*) of a stator core 10.

FIG. 6*a* shows a schematic cross-section of a bending station 39, a transfer station 90 and part of a stator 10. The transfer station 90 has three channels 98*a*, 98*b*, 98*c* having respective receiving openings 99*a*, 99*b*, 99*c*. The transfer station 90 is laterally displaceable (see arrow in FIGS. 5 and 6*a*) with respect to bending station 39. Therewith, the receiving openings 99*a*, 99*b*, 99*c* can be aligned with a pre-shaped insulator 30 (see FIG. 4*e*) arranged around the stamp member 50 of the bending station 39.

FIG. 6*b* shows a side view of the transfer station 90 with the receiving openings 99*a*, 99*b*, 99*c*. When a pre-shaped insulator is translated along the bending station 39 by a removing tool 91 (see FIG. 5) it will exit the bending station 39 and will be transferred into the aligned receiving opening 99*c*. Once a pre-shaped insulator has been transferred into the receiving opening 99*c* and into channel 98*c*, the transfer station 90 will be laterally translated such as to have another receiving opening (e.g. receiving opening 99*b*) aligned with the bending station 39 so that another pre-shaped insulator can be received by the transfer station 90.

The receiving channels 98*a*, 98*b*, 98*c* are separated from each other by walls 101. The walls 101 are only present in about ⅔ of the length of the transfer station 90 such that the channels 98*a*, 98*b*, 98*c* merge together to form one joint channel 102 in the transfer station 90 (shown on the right hand side in FIG. 6*a*). The walls 101 slightly taper such as to slightly converge in the axial direction in FIG. 6*a* (from left to right). By pushing three pre-shaped insulators axially through the channels 98*a*, 98*b*, 98*c*, the pre-shaped insulators will be pushed towards each other in the joint channel 102. The three pre-shaped insulators can then be jointly transferred from an exit opening 97 of the transfer station 90 to one slot 11 of a stator 10. Of course, less than three or more than three channels can be used in case less or more pre-shaped insulators should be inserted into one slot.

The invention claimed is:

1. A method for preparing pre-shaped insulators comprising:

providing a cut insulator sheet of a flat insulating material in a bending station of an apparatus between a base station comprising a recess and a stamp member;

pressing a part of the insulator sheet into the recess by moving the stamp member laterally into the recess and thereby forming a U-shaped insulator sheet with a first tail and a second tail;

contacting the first tail with an outer contact surface of the stamp member by moving a first bending operator with respect to the base station; and contacting the second tail to one or more of the outer contact surface of the stamp member or to the first tail by moving a second bending operator with respect to the base station.

2. The method according to claim 1, wherein the apparatus is an apparatus comprising: the bending station, the bending station comprising: the base station comprising the recess with a contact surface defining a first part of an outer circumference of the at least one pre-shaped insulator; the stamp member laterally moveable with respect to the recess from an open to a closed position, the stamp member comprising: an inner contact surface for pressing a middle part of the insulator sheet against the contact surface of the recess and defining a first part of the inner circumference of the pre-shaped insulator, and an outer contact surface defining a second part of the inner circumference of the pre-shaped insulator; the first bending operator moveable with respect to the base station from an open position to a closed position, comprising a first bending surface for bending the first tail of the insulator sheet against the outer contact surface of the stamp member; and the second bending operator moveable with respect to the base station from an open position to a closed position, comprising a second bending surface for bending the second tail of the insulator sheet against one or more of the first tail or the outer contact surface of the stamp member.

3. The method according to claim 1, wherein the first bending operator and the second bending operator are rotated around a respective rotation axis.

4. The method according to claim 1, wherein the second tail is pressed against the first tail to form an overlapping section.

5. The method according to claim 1, wherein:

a removing tool is introduced in opposing slots of the stamp member and of at least one of the base station and the second bending operator;

the removing tool contacts the pre-shaped insulator; and the removing tool is moved within the apparatus and thereby removes the pre-shaped insulator from the bending station of the apparatus.

6. The method according to claim 1, wherein at least two pre-shaped insulators are arranged in a transfer station.

7. The method according to claim 6, wherein the at least two pre-shaped insulators are inserted into a slot of a stator core in one step.

* * * * *